United States Patent
Iyer et al.

(10) Patent No.: US 9,680,799 B2
(45) Date of Patent: Jun. 13, 2017

(54) MASKING AND UNMASKING DATA OVER A NETWORK

(71) Applicant: Bank of America Corporation, Charlotte, NC (US)

(72) Inventors: Shankar Ramasubramanian Iyer, East Windsor, NJ (US); Maria Auxilia Dominique, Kendall Park, NJ (US); Navanith R. Keerthi, Lawrenceville, NJ (US); Suresh G. Nair, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 70 days.

(21) Appl. No.: 14/859,965

(22) Filed: Sep. 21, 2015

(65) Prior Publication Data

US 2017/0085534 A1    Mar. 23, 2017

(51) Int. Cl.
| | |
|---|---|
| G06F 21/71 | (2013.01) |
| H04L 29/06 | (2006.01) |
| G06F 17/30 | (2006.01) |
| G06F 21/62 | (2013.01) |
| H04L 12/22 | (2006.01) |

(52) U.S. Cl.
CPC .... H04L 63/0428 (2013.01); G06F 17/30569 (2013.01); G06F 21/6263 (2013.01); H04L 63/20 (2013.01)

(58) Field of Classification Search
None
See application file for complete search history.

(56) References Cited

U.S. PATENT DOCUMENTS 8,347,396 B2 * 1/2013 Grigsby ............. G06F 21/6263
                                              380/268
8,930,381 B2 * 1/2015 Raghunathan ...... G06F 21/6254
                                              707/756

OTHER PUBLICATIONS

IN20130372413. Abstract English. Jul. 31, 2015.*
Data Transformation Technique for Protecting Private Information in Privacy Preserving Data Mining. Vijayarani et al. ACIJ(2010).*
Privacy Application Infrastructure Confidential Data Masking. Liver et al. IEEE(2009).*

* cited by examiner

*Primary Examiner* — Venkat Perungavoor
(74) *Attorney, Agent, or Firm* — Michael A. Springs

(57) ABSTRACT

An apparatus with one or more masking rules stored in a memory receives unmasked data associated with a first session identifier via a network and converts the received unmasked data into masked data by applying the one or more masking rules to the unmasked data. The apparatus generates a first mapped identifier associated with the unmasked data and first session identifier. The apparatus also receives, via a network, a second mapped identifier associated with a second session identifier. Upon receiving the second mapped identifier and second session identifier, the apparatus determines whether the second session identifier corresponds to the first session identifier and finds the first mapped identifier corresponding to the received second mapped identifier. The apparatus retrieves and sends the unmasked data associated with the first mapped identifier.

19 Claims, 3 Drawing Sheets

MASKING AND UNMASKING DATA OVER A NETWORK

TECHNICAL FIELD OF THE INVENTION

The present invention relates generally to the field of securing networks and, more specifically, to masking and unmasking data over a network.

BACKGROUND

Computer networks may be susceptible to intrusion by network tools such as network sniffers and key loggers. The more sensitive data that such tools are able to access, the greater the exposure of the network. Thus, to enhance the security of computer networks, it is desirable to develop systems and methods for reducing the amount of sensitive data that such network tools are able to access in case of an intrusion.

SUMMARY

According to one embodiment of the present disclosure, an apparatus stores one or more masking rules in a memory. The apparatus receives unmasked data associated with a first session identifier via a network and converts the received unmasked data into masked data by applying the one or more masking rules to the unmasked data. The apparatus then generates a first mapped identifier associated with the unmasked data and first session identifier and stores all three in a memory. The apparatus then sends the masked data and associated first mapped identifier to a user workstation. The apparatus is further operable to receive, via a network, a second mapped identifier associated with a second session identifier. In response to receiving the second mapped identifier and second session identifier, the apparatus determines whether the second session identifier corresponds to the first session identifier stored in the memory. In response to determining that the second session identifier corresponds to the first session identifier, the apparatus finds the first mapped identifier stored in the memory corresponding to the received second mapped identifier. The apparatus then retrieves the unmasked data associated with the first mapped identifier from the memory and sends the unmasked data to the user workstation.

Certain embodiments may provide one or more technical advantages. One advantage of one embodiment may include the ability to convert unmasked data to masked data in a centralized manner so that in case of a network intrusion, the exposure of the network is reduced. For example, in the present embodiment, sensitive and personal information is converted from unmasked data to masked data at a central masking server before such data traverses the Internet to access a network service portal such as a website. This limits the ability of unauthorized network tools such as network sniffers to intercept and access the unmasked data. Network exposure is further reduced by using the same masking rules for the same type of personal or sensitive data so that similar data is masked in the same way thereby keeping unauthorized users and network tools, such as network sniffers, from exploiting inconsistent masking rules.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE DRAWINGS

Embodiments of the present disclosure and its advantages are best understood by referring to FIGS. 1 through 4 of the drawings, like numerals being used for like and corresponding parts of the various drawings.

The security of a computer network is important to the functioning of the network. One way of securing networks is by preventing unauthorized intrusions into the networks. However, no network is impervious to attacks. So, for a network to function securely, another layer of protection is needed in case the network is infiltrated by unauthorized network tools such as network sniffers and key loggers. One way of providing such security is by reducing the amount of valuable data that the unauthorized network tools can access if they break into the network. The present disclosure contemplates one way of reducing the exposure of such data.

Network service portals, such as Internet webpages, sometimes require users to enter sensitive and personal information before the user may access the service. For instance, websites facilitating filing tax forms or viewing personal health records may require users to create an account that is associated with a username, password, social security number, phone number, and/or other sensitive and personal information. To access the service or records, a user may need to first enter such information into a web form to verify the user's identity. Doing so repeatedly can be cumbersome. To enhance the user's experience and make it easier for the user to access the service, it is advantageous to store such personal and sensitive information so that a user does not need to enter it every time the user accesses the service. However, storing such personal and sensitive information at a user workstation can be dangerous because in case of a network breach, unauthorized users and network tracking tools may acquire the information and impersonate the authorized user to improperly gain access to the user's services and/or records.

This disclosure contemplates a system that reduces the data exposure of a network by employing two distinct processes. In the first process, the system converts unmasked, clear text data into masked data in a centralized manner before such data traverses a global network such as the Internet and is rendered on the user workstation. This keeps unauthorized network tools from accessing the unmasked data as it travels from a secure location to the user workstation. Subsequently, in the second process, the system converts masked data back into unmasked, clear text data so that the user and other authorized applications may access the unmasked data. In this manner, network tools such as network sniffers and key loggers that infiltrate a network are only able to intercept masked data while the unmasked data remains secure.

Figure 1:
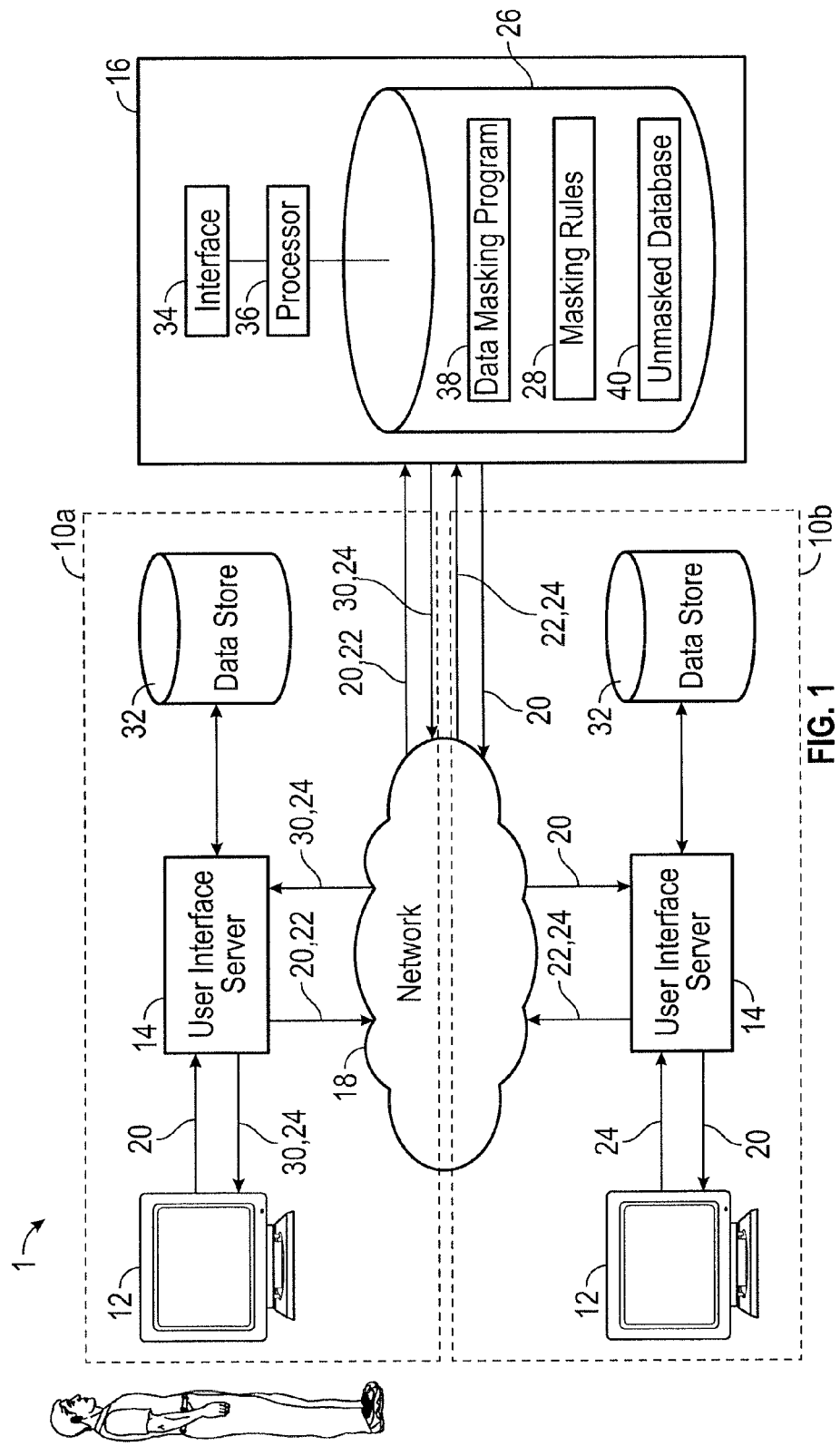
FIG. 1 illustrates an example system for masking and unmasking data.

FIG. 1 illustrates a system 1 for masking and unmasking data over network 18. FIG. 1 further shows masking data flow 10a for masking data and unmasking data flow 10b for unmasking data.

As illustrated, in the present embodiment of masking data flow 10a, when a network service portal, such as a webpage, is retrieved by workstation 12, a user interface server 14 identifies any sensitive personal information before the webpage is rendered and sends the information, unmasked, to a data masking server 16 over network 18. Along with this unmasked data 20, the user interface server 14 also sends a session identifier 22 which identifies the Internet or network session associated with the unmasked data 20. The data masking server 16 generates a mapped identifier 24 and associates the unmasked data 20 with the mapped identifier 24. The data masking server 16 stores the unmasked data 20, the session identifier 22, and the mapped identifier 24 in database 40 of memory 26. Data masking server 16 applies one or more masking rules 28 to mask the unmasked data 20 and returns masked data 30 along with a mapped identifier 24 to the user interface server 14. The masked data 30 may then be displayed on the user workstation 12.

Subsequently, system 1 may execute unmasking data flow 10b if the user wishes to view the unmasked data 20 or if the user interface server 14 needs to access unmasked data 20. In this example embodiment of unmasking data flow 10b, user interface server 14 sends the session identifier 22 and mapped identifier 24 to the masking server 16 over network 18. Masking server 16 authenticates the request using session identifier 22, retrieves the unmasked data 20 from memory 26 using mapped identifier 24, and sends the unmasked data 20 to user interface server 14 over network 18.

The present embodiment provides several technical advantages. For example, in the present embodiment, network security is enhanced because sensitive and personal information is converted from clear text to masked data at a central masking server 16 before such data traverses the Internet to access a network service portal such as a website. This limits the ability of unauthorized network tools such as network sniffers to intercept and access the unmasked data. Further, by using the same masking rules 28 for the same type of personal or sensitive data, similar data is masked in the same way which keeps unauthorized users or network tools, such as network sniffers, from exploiting inconsistent masking rules 28. As an example, if web applications use individualized masking rules 28, one web application may mask the first half of all user social security numbers and a second web application may mask the second half of all user social security numbers. In such a situation, an unauthorized user or network tool that has access to both web applications may combine the masked and unmasked social security numbers associated with the web applications and determine the full social security numbers for any user that uses both applications. The present embodiment reduces the possibility of such exploitation across network service portals, such as web applications and websites, by using consistent masking rules 28 at masking server 16.

Additionally, in this embodiment, sensitive and personal information is stored so that users do not need to manually enter such information into a web form every time they access a network resource. Further, such sensitive and personal information is stored at a data masking server 16 instead of at a user workstation 12. This reduces the likelihood that the sensitive and personal information will be accessed by unauthorized entities.

As an additional advantage, in the present embodiment, personal and sensitive information may be encrypted to reduce the possibility of such information being intercepted and misappropriated as it traverses network 18.

In system 1, workstation 12 enables one or more users to interact with masking server 16 over network 18. Workstation 12 may include one or more laptops, personal computers, monitors, display devices, handheld devices, smartphones, servers, user input devices, or other suitable components for enabling user input. Workstation 12 may be a part of an enterprise or could remotely access an enterprise. Users may use workstation 12 to access one or more network service portals through user interface server 14.

User interface server 14 may be operable to receive inputs from the one or more users. User interface server 14 may also communicate with data store 32 and data masking server 16. Data store 32 may store masked data 30 which is rendered when user interface server 14 accesses a network resource portal. Further, user interface server 14 may communicate with masking server 16 to send and receive unmasked data 20 and masked data 30. User interface server 14 may also send and receive other information including session identifiers 22 and mapped identifier 24 to and from masking server 16.

When a user initiates a session on workstation 12, a session identifier 22 may be generated by user interface server 14. For example, session identifier 22 may be generated when a user launches a service portal such as a website on the workstation 12. Session identifier 22 may also be generated when a user launches a service, logs into a user account, or initiates any sort of session. Session identifier 22 may expire after a certain period of time or upon the occurrence of certain events. For example, session identifier 22 may have a predetermined expiration time or may expire when a user terminates use of a service, navigates away from a webpage, logs out of an account or performs any other suitable action. In some embodiments, session identifier 22 may not expire but may change in response to an action performed by the user or the elapsing of a predetermined period of time.

Network 18 represents any suitable network operable to facilitate communication between the components of system 1. Network 18 may include any interconnecting system capable of transmitting audio, video, signals, data, messages, or any combination of the preceding. Network 18 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

In the illustrated embodiment, masking server 16 includes a memory 26, server interface 34, and a processor 36. Memory 26 may comprise masking program 38, masking rules 28, and unmasked database 40.

Server interface 34 represents any suitable device operable to receive information from network 18, transmit information through network 18, perform suitable processing of the information, communicate to other devices, or any combination thereof. For example, server interface 34 may receive or transmit unmasked data 20 as well as one or more identifiers for identifying the unmasked data 20. Further, server interface 34 may also transmit masked data 30. Server interface 34 represents any port or connection, real or virtual, including any suitable hardware and/or software, including protocol conversion and data processing capabilities, to communicate through a LAN, WAN, or other communication system that allows masking server 16 to exchange information over network 18 with workstation 12 or any other components of system 1.

Processor 36 communicatively couples server interface 34 and memory 26 and controls the operation of masking server 16. Processor 36 includes any hardware and software that operates to control and process information. Processor 36 may execute computer-executable program instructions stored in memory 26. Processor 36 may include, but is not limited to, a microprocessor, an application specific integrated circuit (ASIC), and or state machines. Processor 36 is not limited to a single processing device and may encompass multiple processing devices.

Memory 26 stores, either permanently or temporarily, data, operational software, other information for processor 26, other components of masking server 16, or other components of system 1. Memory 26 includes any one or a combination of volatile or non-volatile local or remote devices suitable for storing information. For example, memory 26 may include RAM, ROM, flash memory, magnetic storage devices, optical storage devices, network storage devices, cloud storage devices, solid state devices, or any other suitable information storage device or a combination of these devices. Memory 26 may store information in one or more databases, file systems, tree structures, relational databases, any other suitable storage system, or any combination thereof. Furthermore, different information stored in memory 26 may use any of these storage systems. The information stored in memory 26 may be encrypted or unencrypted, compressed or uncompressed, and static or editable. Memory 26 may store information in one or more caches. In some embodiments, memory 26 may have one or more distributed caches.

Masking rules 28 may include rules for converting unmasked data 20 into masked data 30. Masking rules 28 may specify the type or category of information that needs to be masked. For example, masking rules 28 may specify that certain information such as social security numbers, tax IDs, zip codes, dates of birth, phone numbers, email and physical addresses, user names, passwords etc. are all data types that need to be masked. Masking rules 28 may further specify how different data types are to be masked. For example, masking rules 28 may specify that unmasked data 20 is masked by using substitution algorithms (where particular types of data (e.g., names) are substituted for a predetermined data value (e.g., a generic name)), shuffling algorithms (where, for example, the letters of a name are shuffled to mask the original name), algorithms for converting numeric values into specific numeric ranges, algorithms for converting the unmasked data 20 into symbols (e.g., converting the first five digits of all social security numbers into asterisks), or any combination of these and other masking techniques.

Figure 2:
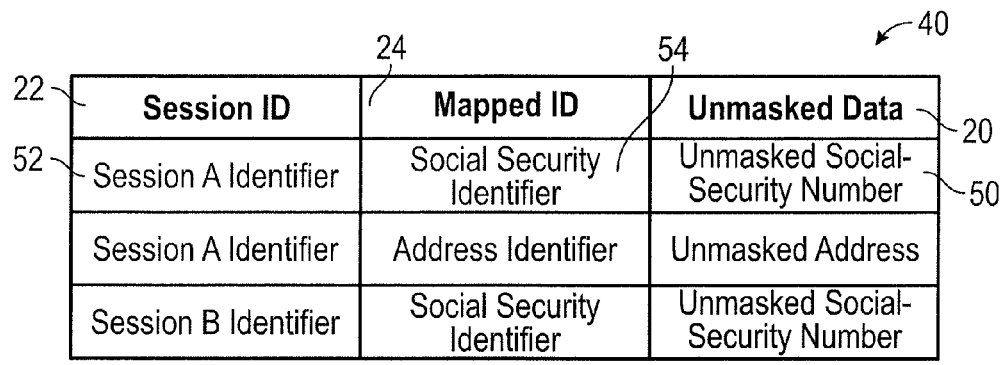
FIG. 2 illustrates an example database with unmasked data, session identifiers, and mapped identifiers.

Memory 26 may also store unmasked data 20, one or more session identifiers 22, and one or more mapped identifiers 24 in an unmasked database 40. One example of such unmasked database 40 is illustrated in FIG. 2 and discussed in greater detail below. In addition to the masking rules 28 and unmasked database 40, memory 26 may include any suitable information for use in the operation of masking server 16.

For example, in the illustrated embodiment, memory 26 includes masking program 38. Processor 26 may execute masking program 38 to facilitate masking unmasked data 20 by implementing masking data flow 10a as described in greater detail with respect to FIG. 3 below. Processor 26 may also execute masking program 38 to facilitate unmasking masked data 20 by implementing unmasking data flow 10b as described in greater detail with respect to FIG. 4 below.

FIG. 2 illustrates an example unmasked database 40 comprising unmasked data 20, session identifiers 22, and mapped identifiers 24 stored in memory 26. During the masking process, unmasked data 20 and session identifier 22 are associated with a mapped identifier 24. Unmasked database 40 may store all three pieces of information along with the associations between them. For example, as illustrated in FIG. 2, unmasked database 40 may store the unmasked data 20, session identifiers 22, and mapped identifiers 24 in a structured, tabular format. Unmasked database 40 may be stored in any data storage component suitable for storing unmasked data 20, session identifier 22, and mapped identifier 24 as well as the relationships between these pieces of information. In one embodiment, unmasked database 40 may be stored in a distributed cache.

As further illustrated in FIG. 2, each masked data element, such as unmasked social security number 50 may be associated with a session identifier 22 such as session A identifier 52 and mapped identifier 24 such as social security number identifier 54. Because the mapped identifiers 24 are each associated with a session identifier 22 and unmasked data 20, system 1 may search unmasked database 40 for received session identifier 22 and received mapped identifier 24 to retrieve unmasked data 20. So, for example, if unmasked database 40 has session A identifier 52 and social security number identifier 54 stored, system 1 can retrieve unmasked social security number 54 from unmasked database 40. If, however, received session identifier 22 does not match session A identifier 52 because session A identifier 52 has expired or changed, then system 1 may not retrieve unmasked social security number 50. In some embodiments, when session identifier 22 expires or changes, mapped identifier 24 and/or unmasked data 20 may be deleted from unmasked database 40.

Figure 3:
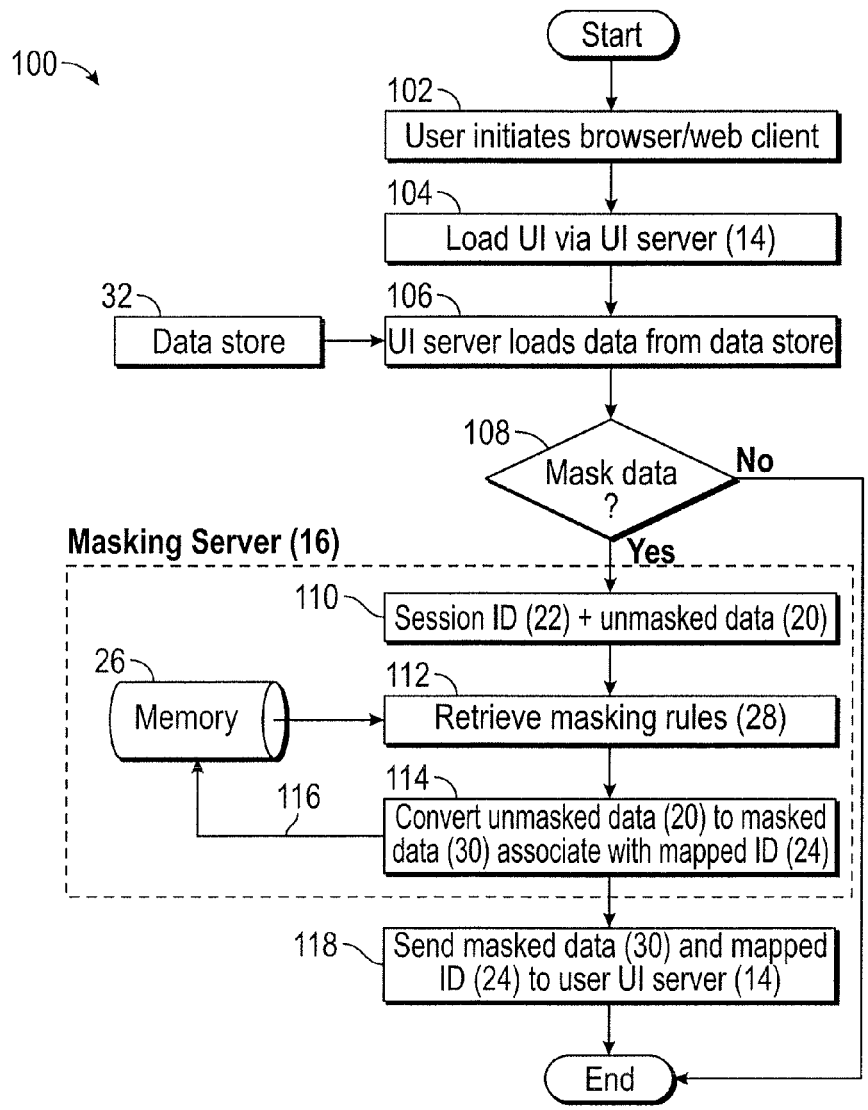
FIG. 3 illustrates a process for converting unmasked data into masked data.

FIG. 3 illustrates a process 100 for converting unmasked data 20 into masked data 30. At step 102, a user launches a web browser or other client for accessing a network resource portal on workstation 12. At step 104, workstation 12 loads a user interface via user interface server 14. At step 106, user interface server 14 retrieves data for network services or resource from data store 32. At step 108, user interface server 14 determines if any of the data for the retrieved network service or resource is the type of data that needs to be masked. If no data needs to be masked, the process may end. If any of the data in the retrieved network service or resource needs to be masked, at step 110 user interface server 14 generates a session identifier 22 and sends the unmasked data 20 along with session identifier 22 to masking server 16. At step 112, masking server 16 retrieves masking rules 28 from memory 26. At step 114, masking server 16 applies masking rules 28 to unmasked data 20 and converts unmasked data 20 into masked data 30. At step 114, masking server 16 also generates a mapped identifier 24 and associates unmasked data 20 with the mapped identifier 24. At step 116, masking server 16 sends unmasked data 20, mapped identifier 24, and session identifier 22 for storage in memory 26. At step 118, masking server 16 sends masked data 30 and mapped identifier 24 to the user interface server 14.

Figure 4:
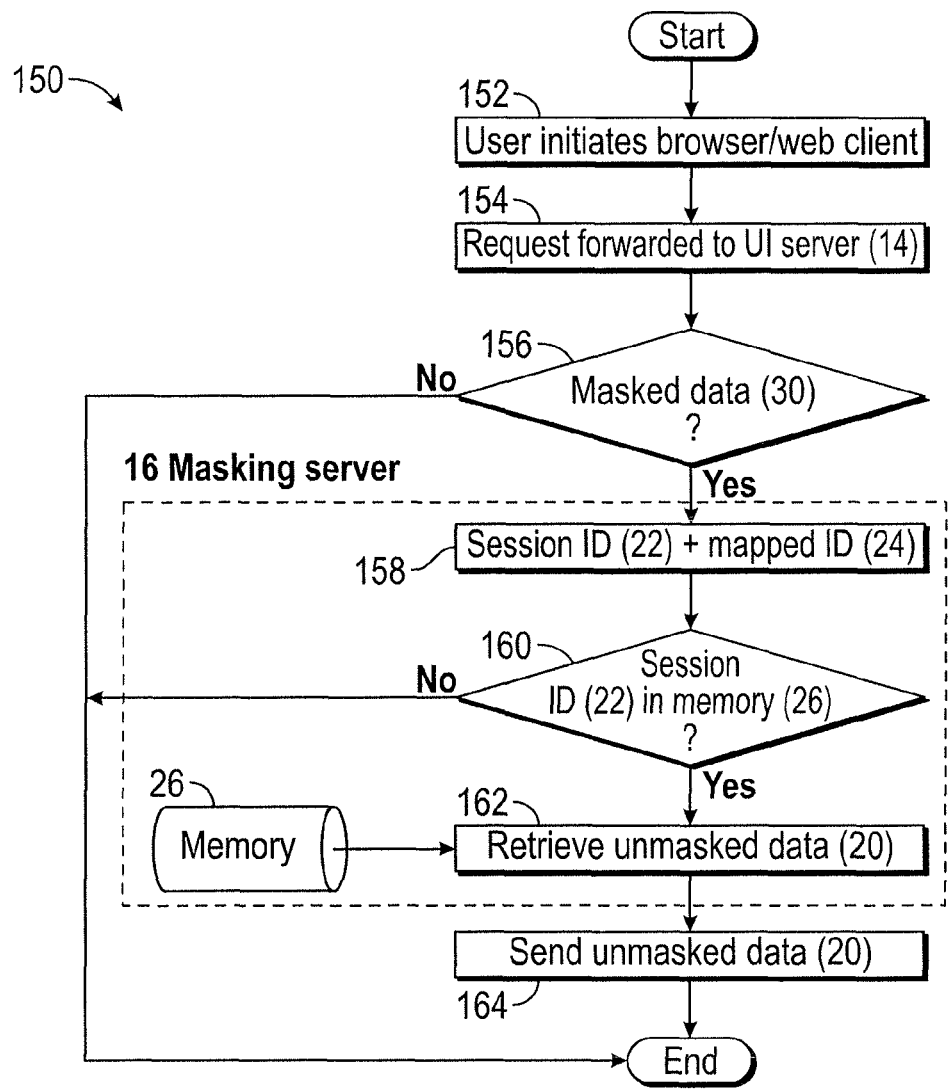
FIG. 4 illustrates a process for converting masked data into unmasked data.

FIG. 4 illustrates a process 150 for unmasking masked data 30. The process starts at step 152 when a user launches a network service or resource portal such as a webpage at user workstation 12. At step 154, the launch request is forwarded to user interface server 14. At step 156, user interface server 14 checks to see if the network service or resource portal contains masked data 30. If the network service or resource portal does not contain any masked data 30, the process may end. If the network service or resource portal contains masked data 30, process 150 continues to step 158 where user interface server 14 sends a session identifier 22 and mapped identifier 24 to masking server 16. At step 160, masking server 16 searches memory 26 for received session identifier 22. Because session identifier 22 may be dynamic, i.e. it may either expire or change after a given time period and/or upon the occurrence of certain events, the received session identifier 22 may be different from the one or more session identifiers stored in memory 26. At step 160, if memory 26 does not have received session identifier 22, the process may end. If memory 26 has received session identifier 22, at step 162 masking server 16 searches for mapped identifier 24 and retrieves the corresponding unmasked data 20 from memory 26. At step 164, masking server 16 returns the unmasked data 20 to user interface server 14 via network 18 for further processing or rendering.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants wish to note that they do not intend any of the appended claims to invoke 35 U.S.C. §112(f) as it exists on the date of filing hereof unless the words "means for" or "step for" are explicitly used in the particular claim.

What is claimed is:

1. An apparatus comprising:
a memory operable to store one or more masking rules;
an interface operable to receive, via a network, unmasked data associated with a first session identifier from a user interface server;
a processor, in response to receiving unmasked data associated with a first session identifier, operable to;
convert the received unmasked data into masked data by applying the one or more masking rules to the received unmasked data;
generate a first mapped identifier and associate it with the received unmasked data and the associated first session identifier;
store the unmasked data, associated first session identifier; and associated first mapped identifier in the memory;
and send the masked data and associated first mapped identifier to a user workstation, wherein the masked data is stored into a data store;
the interface being further operable to receive, via a network, a second mapped identifier associated with a second session identifier from the user interface server;
the processor, in response to receiving the second mapped identifier associated with the second session identifier; being further operable to:
determine whether the second session identifier corresponds to the first session identifier stored in the memory;
in response to determining that the second session identifier corresponds to the first session identifier stored in the memory, find the first mapped identifier stored in the memory corresponding to the received second mapped identifier;
retrieve the unmasked data associated with the first mapped identifier from the memory;
and send the unmasked data to the user workstation.

2. The apparatus of claim 1, wherein the first session identifier expires after a predetermined amount of time and wherein the first mapped identifier is deleted from the memory when the first session identifier expires.

3. The apparatus of claim 1, wherein the first session identifier is generated when a service is initialized at the user workstation and the first session identifier expires when the service is terminated.

4. The apparatus of claim 1, wherein the masking rules specify the masking techniques for converting the unmasked data into masked data.

5. The apparatus of claim 4, wherein the masking rules specify masking the data by converting the unmasked data into symbols.

6. The apparatus of claim 1, wherein the session identifiers, mapped identifiers, and unmasked data that are stored in the memory are all encrypted.

7. The apparatus of claim 1, wherein the masking rules specify the type of information that needs to be masked.

8. An apparatus for converting unmasked data into masked data comprising:
an interface operable to receive, upon the initiation of a session at a user workstation, unmasked data associated with a first session identifier via a network from a user interface server; and
a processor operable to:
apply one or more masking rules to the received unmasked data;
generate a first mapped identifier and associate the first mapped identifier with the received unmasked data and the first session identifier; and
send the masked data and associated first mapped identifier to the user workstation via the network, wherein the masked data is stored into a data store; and
a memory operable to store the unmasked data, associated first session identifier, and associated first mapped identifier;
wherein the interface is further operable to receive, via a network, a second mapped identifier associated with a second session identifier from a user interface server;
wherein the processor is further operable to:
determine whether the second session identifier corresponds to the first session identifier stored in the memory;
in response to determining that the second session identifier corresponds to the first session identifier stored in the memory, find the first mapped identifier stored in the memory corresponding to the received second mapped identifier;

retrieve the unmasked data associated with the first mapped identifier from the memory; and send the retrieved unmasked data to the user workstation.

9. The apparatus of claim 8, wherein the masking rules specify the masking techniques for converting the unmasked data into masked data.

10. The apparatus of claim 9, wherein the masking rules specify masking the data by converting the unmasked data into symbols.

11. The apparatus of claim 8, wherein the stored first session identifier expires upon the termination of the session at the user workstation.

12. The apparatus of claim 11, wherein the stored first mapped identifier and stored unmasked data are deleted when the stored first session identifier expires.

13. The apparatus of claim 8, wherein the masking rules specify the type of information that needs to be masked.

14. A method comprising: receiving, by a masking server, via a network, unmasked data associated with a first session identifier; converting, by the masking server, the received unmasked data into masked data by applying one or more masking rules to the received unmasked data; generating, by the masking server, a first mapped identifier and associating it with the received unmasked data and the associated first session identifier; storing, by the masking server, the unmasked data, associated first session identifier, and associated first mapped identifier in a memory; sending, by the masking server, the masked data and associated first mapped identifier to a user workstation wherein the masked data is stored into a data tore;

receiving, by the masking server, via a network, a second mapped identifier associated with a second session identifier from the user interface server;

determining, by the masking server, whether the second session identifier corresponds to the first session identifier stored in the memory;

in response to determining that the second session identifier corresponds to the first session identifier stored in the memory, finding, by the masking server, the first mapped identifier stored in the memory corresponding to the received second mapped identifier;

retrieving, by the masking server, the unmasked data associated with the first mapped identifier from the memory; and sending, by the masking server, the retrieved unmasked data to the user workstation.

15. The method of claim 14, wherein the first session identifier expires after a predetermined amount of time and wherein the first mapped identifier is deleted from the memory when the first session identifier expires.

16. The method of claim 14, wherein the first session identifier is generated when a service is initialized at the user workstation and the first session identifier expires when the service is terminated at the user workstation.

17. The method of claim 14, wherein the masking rules specify the masking techniques for converting the unmasked data into masked data.

18. The method of claim 14, wherein the session identifiers, mapped identifiers, and unmasked data that are stored in the memory are encrypted.

19. The method of claim 14, wherein the first session identifier is generated when a user logs into a user account and the first session identifier expires when the user logs out of the user account.

* * * * *